United States Patent [19]
House

[11] Patent Number: 5,977,030
[45] Date of Patent: Nov. 2, 1999

[54] METHOD OF INCREASING THE LSRV OF AQUEOUS FLUIDS AND OIL-IN-WATER EMULSIONS PREPARED THEREBY

[75] Inventor: Roy F. House, Houston, Tex.

[73] Assignee: Venture Innovations, Inc., Houston, Tex.

[21] Appl. No.: 09/228,515

[22] Filed: Jan. 11, 1999

Related U.S. Application Data

[63] Continuation-in-part of application No. 09/121,712, Jul. 24, 1998, Pat. No. 5,916,849.

[51] Int. Cl.⁶ ............................... C09K 7/02; C09K 3/00
[52] U.S. Cl. ..................... 507/110; 507/140; 507/209; 507/211; 507/213; 507/269; 516/53
[58] Field of Search ..................... 507/110, 140, 507/209, 211, 213, 269; 516/53

[56] References Cited

U.S. PATENT DOCUMENTS

| | | | |
|---|---|---|---|
| 1,824,221 | 9/1931 | Mason | 507/110 |
| 2,224,135 | 12/1940 | Boehm | 92/2 |
| 2,713,029 | 7/1955 | Fuller | 507/110 |
| 3,065,170 | 11/1962 | Dumbauld | 507/110 |
| 3,998,742 | 12/1976 | Walker | 507/110 |
| 4,233,438 | 11/1980 | Myers et al. | 507/110 |
| 4,329,448 | 5/1982 | Cox et al. | 507/110 |
| 5,106,517 | 4/1992 | Sheu et al. | 507/110 |
| 5,804,535 | 9/1998 | Dobson et al. | 507/140 |

*Primary Examiner*—Philip Tucker
*Attorney, Agent, or Firm*—Roy F. House

[57] ABSTRACT

Disclosed are oil-in-water emulsions containing an aqueous polysaccharide-containing continuous phase, an emulsified oleaginous liquid, and an oligosaccharide mixture composed of sugar units selected from the group consisting of arabinose, mannose, galactose, glucose, xylose, and mixtures thereof, and which consists primarily of pentosans and hexosans containing from one to ten sugar units. The emulsions preferably also contain an alkaline earth metal oxide or hydroxide, preferably lime. The emulsions may also contain aphrons. Also disclosed is a method of increasing the low shear rate viscosity of aqueous polysaccharide-containing fluids which comprise incorporating into the fluids an oligosaccharide mixture, an oleaginous liquid, and optionally, an alkaline earth metal oxide or hydroxide.

13 Claims, No Drawings

METHOD OF INCREASING THE LSRV OF AQUEOUS FLUIDS AND OIL-IN-WATER EMULSIONS PREPARED THEREBY

This patent application is a continuation-in-part of patent application Ser. No. 09/121,712 filed Jul. 24, 1998 now U.S. Pat. No. 5,916,849, to which priority is claimed herein.

BACKGROUND OF THE INVENTION

The invention pertains to aqueous base fluids which exhibit an enhanced low shear rate viscosity (hereinafter referred to as LSRV) and, in particular, to oil-in-water emulsions which exhibit an enhanced LSRV.

PRIOR ART

It is well known in the oil and gas well drilling and servicing art to employ aqueous drilling and servicing fluids which exhibit an elevated LSRV. Such fluids are pseudoplastic, shear thinning fluids and are particularly preferred fluids when conducting horizontal or directional drilling or conducting well servicing operations in horizontal or directionally drilled boreholes. See for example Dobson, Jr. et al. U.S. Pat. No. 5,804,535.

SUMMARY OF THE INVENTION

I have now determined that oil-in-water emulsions can be prepared using as the emulsifier an oligosaccharide mixture composed of sugar units selected from the group consisting of arabinose, mannose, galactose, glucose, xylose, and mixtures thereof consisting primarily of pentosens and hexosans containing from one to ten combined sugar units, preferably from one to four combined sugar units, hereinafter referred to as "OSM", and, optionally an alkaline earth metal oxide or hydroxide, preferably lime.

The OSM preferably comprises the water soluble portion of thermally hydrolyzed lignocellulose.

I have further determined that the addition of an oleaginous liquid to aqueous fluids which exhibit an elevated LSRV and which contain an OSM increases the viscosity of such fluids, most particularly when an alkaline earth metal oxide or hydroxide is also incorporated into the fluids.

It is an object of the invention to provide oil-in-water emulsions containing an OSM and, preferably, an alkaline earth metal oxide or hydroxide, preferably lime, as more fully disclosed herein.

It is another object of the invention to provide a method of increasing the viscosity of aqueous polysacchzlride-containing fluids, preferably such fluids which exhibit an elevated LSRV, by incorporating therein an OSM and an oleaginous liquid as more fully disclosed herein, and the fluids prepared thereby.

Still another object of the invention is to provide a method of increasing the viscosity of aqueous polysaccharide-containing fluids, preferably such fluids which exhibit an elevated LSRV, by incorporating therein an OSM, an oleaginous liquid, and an alkaline earth metal oxide or hydroxide as more fully disclosed herein, and the fluids prepared thereby.

An additional object of the invention is to provide oil-in-water emulsions containing an OSM, and preferably an alkaline earth metal oxide or hydroxide, most preferably lime, which exhibit an elevated L,SRV and which contains aphrons as more fully disclosed herein.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The oligosaccharide mixture (OSM) useful in this invention is composed of sugar units selected from the group consisting of arabinose, mannose, galactose, glucose, xylose, and mixtures thereof consisting of pentosans and hexosans containing from one to ten combined sugar units, preferably one to four combined sugar units.

The oligosaccharide mixture is preferably obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans and pentosans, 70% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. The pentosans and hexosans contain primarily from one to about four combined sugar units composed of arabinose, mannose, galactose, glucose, and xylose sugar units.

Water solubles resulting from the hydrolysis of other polysaccharide-containing materials such as seeds (i.e., cereal grains and other polysaccharide-containing plant products), plant extrudates, waste vegetable materials, and even refined polysaccharide products can also be used as the OSM in this invention.

Oil-in-water emulsions can be prepared by dispersing the OSM in an aqueous liquid and mixing therewith an alkaline earth metal oxide or hydroxide and an oleaginous liquid. The higher the shear during mixing, the more stable the emulsion will be, as is well known in the art. The viscosity and stability of the emulsion can be increased by incorporating a viscosifier/suspending agent in the aqueous phase of the emulsion. Other additives to impart specific properties or characteristics to the emulsion can also be added thereto.

The oleaginous liquid may be any organic, water insoluble liquid which will form a discrete phase in admixture with the aqueous liquid, such as hydrocarbons, vegetable oils, polypropylene glycols, and the like water insoluble liquids. When the aqueous liquid is a salt solution, organic liquids normally water soluble but which are insoluble in the salt solution may be utilized. Preferred oleaginous liquids are hydrocarbons such as the various fractions refined from petroleum oils, synthetic liquids manufactured from various organic alkenes, acids, ethers, alcohols, and the like, and crude oil, such as polyalphaolefins, internal olefins, carboxylic acid esters, phosphate esters, and the like.

The aqueous liquid may be fresh water, a natural brine, sea water, or a formulated brine. The formulated brine is manufactured by dissolving one or more soluble salts in water, a natural brine, or sea water. Representative salts are the chloride, bromide, acetate, and formate salts of cesium, potassium, sodium, calcium, magnesium, and zinc.

A supplemental emulsifier as is well known in the art can be added to the oil-in-water emulsions of this invention. In this respect, it is another aspect of this invention to add the OSM as disclosed herein, optionally together with an alkaline earth metal oxide or hydroxide (hereinafter sometimes referred to as "AEMOOH") to oil-in-water emulsions to enhance the stability of such emulsions.

The amount of the oleaginous liquid in the emulsion will depend on the concentration of the OSM and the AEMOOH. Increasing the concentration of the OSM increases the viscosity of the emulsion. Increasing the concentration of oil increases the viscosity of the emulsion. The concentration of the AEMOOH is dependent upon the concentration of the OSM. Generally the concentrations of OSM, oleaginous liquid, and AEMOOH will be such as to produce an emulsion having the desired viscosity and stability. In general the emulsion will contain from about 5% to about 65% by volume of the combined liquid phases (oleaginous liquid and aqueous liquid) of the oleaginous liquid, from about 2 ppb to about 150 ppb OSM, and from 0 ppb to about 3 ppb AEMOOH. Preferably the emulsion will contain from about 10% to about 50% by volume oil (% v/v), from about 2 ppb to about 20 ppb OSM, and from about 0.5 ppb to about 2 ppb AEMOOH.

The oil-in-water emulsions are useful as well drilling and servicing fluids for various oil and gas well operations, dust control operations, agricultural operations (i.e., as carriers for insecticides, pesticides, and the like), and other uses amenable to oil-in-water emulsions.

It is disclosed in House co-pending patent application Ser. No. 09/121,712 filed Jul. 24, 1998 now U.S. Pat. No. 5,916,849, incorporated herein by reference, that the thermal stability of aqueous polysaccharide-containing fluids can be increased and the fluid loss can be decreased by incorporating therein an oligosaccharide mixture composed of arabinose, mannose, galactose, glucose, and xylose sugar units, the oligosaccharide mixture comprising the water soluble portion of thermally hydrolyzed lignocellulose and consisting primarily of pentosans and hexosans containing from one to four combined sugar units. The oligosaccharide mixture is particularly effective in aqueous fluids containing a polysaccharide which imparts an elevated LSRV to the fluids, such as water soluble or dispersible biopolymers.

As indicated, it is another aspect of this invention to increase the viscosity of aqueous polysaccharide-containing fluids, preferably such fluids which exhibit an elevated LSRV, by incorporating therein an OSM and an oleaginous liquid, and optionally an AEMOOH, and to provide the fluids prepared thereby. Such fluids are also oil-in-water emulsions in which the oil is emulsified in the polysaccharide-containing aqueous phase by the OSM and, if present, the AEMOOH.

The preferred polysaccharides useful in the invention are polysaccharides which increase the low shear rate viscosity of the fluid to produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of Xanthomonas compestris bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Scleroglucan polysaccharides produced by fungi of the genus sclerotium are disclosed in U.S. Pat. No. 3,301,848, incorporated herein by reference. Commercially available scleroglucan is sold under the trademarks "Polytran" from the Pillsbury Company and "Actigum CS-11" from CECA S.A. Succinoglycan polysaccharides are produced by cultivating a slime-forming species of Pesudomonas, Rhizobium, Alcaligenes or Agrobacterium, e.g., Pseudomonas sp. NCIB 11264, Pseudomonas sp. NCIB 11592 or Agrobacterium radiobacter NCIB 11883, or mutants thereof, as described in European Pat. No. A40445 or A138255. Commercially available succinoglycan biopolymer is sold by Shell International Chemical Company of London, U.K., under the trademark "Shellflo-S".

Other polysaccharides added to aqueous base borehole fluids to provide characteristics to the fluids other than increasing the low shear rate viscosity include: cellulose derivatives, such as carboxymethyl cellulose, hydroxyethyl cellulose, mixed ethers, and the like; starch derivatives such as carboxymethyl starch, hydroxyethyl starch, hydroxypropyl starch, mixed ethers, and the like, including the partially crosslinked derivatives thereof; guar gum and derivatives thereof; and other polysaccharides as are well known in the art. Such polysaccharides may increase the viscosity at higher shear rates, decrease the fluid loss, or provide other characteristics to the fluids.

The minimum concentration of the polysaccharide polymer required to increase the low shear rate viscosity of the fluid can be determined by routine testing. Thus the minimum concentration will be an amount sufficient to impart to the fluid the desired low shear rate viscosity. Generally the fluids will contain a concentration from about 0.7 kg/m$^3$ (0.25 ppb) to about 17.1 kg/m$^3$ (6 ppb), preferably from about 1.4 kg/m$^3$ (0.5 ppb) to about 14.25 kg/m$^3$ (5 ppb).

The water base borehole fluids of this invention generally will contain materials well known in the art to provide various characteristics or properties to the fluid. Thus the fluids may contain one or more viscosifiers or suspending agents in addition to the polysaccharide required, weighting agents, corrosion inhibitors, soluble salts, biocides, fungicides, seepage loss control additives, bridging agents, deflocculants, lubricity additives, shale control additives, pH control additives, additional emulsifiers, and other additives as desired.

The borehole fluids may contain one or more materials which function as encapsulating or fluid loss control additives to restrict the entry of liquid from the fluid to the contacted shale. Representative materials known in the art include partially solublized starch, gelatinized starch, starch derivatives, cellulose derivatives, humic acid derivatives, lignin derivatives, lignosulfonates, gums, synthetic water soluble polymers, and mixtures thereof.

The fluids of this invention preferably have a pH in the range from about 7.5 to about 11.5, most preferably from 8 to about 11. The pH can be obtained as is well known in the art by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. The preferred base is magnesium hydroxide.

It has been determined that magnesium oxide in combination with the OSM of this invention significantly enhances the thermal stability of the polysaccharide-containing fluids.

It has long been known that magnesium oxide enhances the thermal stability of aqueous fluids containing polysaccharide polymers such as xanthan gum, hydroxyethylcellulose, and the like. Presumably the magnesium oxide functions as an alkaline buffer to prevent the pH of the fluid from decreasing appreciably upon aging the fluid at elevated temperatures.

If desired, water soluble potassium compounds can be incorporated into the fluids of this invention to increase the potassium ion content thereof. Thus it is known to add potassium chloride, potassium formate, potassium acetate, and the like to fluids to enhance the shale stabilizing characteristics of the fluids.

The polysaccharide-containing fluids can be prepared by hydrating the polysaccharide in the aqueous liquid, adding the OSM thereto, and thereafter adding the oleaginous liquid and other materials as desired.

As indicated herein, the combination of the OSM and the oleaginous liquid increases the viscosity of the polysaccharide-containing aqueous fluid. The additional addition of the AEMOOH, preferably lime, to the fluid further increases the viscosity of the fluid. The combination of these materials allows the concentration of the expensive polysaccharide to be decreased without a corresponding decrease in the viscosity of the fluid.

There has been disclosed in co-pending patent application Ser. No. 09/121,713 filed Jul. 24, 1998 now U.S. Pat. No. 5,916,849, incorporated herein by reference, aphron-containing well drilling and servicing fluids containing a polymer which imparts a LSRV of at least 10,000 centipoise and a shear thinning index of at least 10 to the fluid, the OSM as disclosed herein, a foaming surfactant and aphrons.

The oil-in-water emulsion of the present invention may also contain aphrons. This is accomplished by incorporating a compatible foaming surfactant into the emulsion and thereafter generating the aphrons. The aphrons can be generated by means known in the art. The book by Felix Sebba entitled "Foams and Biliquid Foams-Aphrons", John Wiley & Sons, 1987, incorporated herein by reference, is an excellent source on the preparation and properties of aphrons, i.e., microbubbles. Other methods of generating aphrons are disclosed in Michelsen et al. U.S. Pat. No. 5,314,644, incorporated herein by reference, and Yoon et al. U.S. Pat. No. 5,397,001, incorporated herein by reference.

The surfactant for generating the aphrons should be compatible with the oil-in-water emulsion such that the LSRV or the stability of the emulsion are not appreciably decreased. The surfactant may be non-ionic, anionic, cationic, or amphoteric as determined by routine testing.

In order to more completely describe the invention, the following non-limiting examples are given. In these examples and in this specification, the following abbreviations may be used: cc=cubic centimeters; v=volume; kg=kilogram; m$^3$=cubic meter; ppb=pounds per 42 gallon barrel; ppg=pounds per gallon; API=American Petroleum Institute; PV=API plastic viscosity in centipoise; YP=API yield point in pounds per 100 square feet; rpm=revolutions per minute; OS=off—scale; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; AEMOOH=alkaline earth metal oxide or hydroxide; OSM=oligosaccharide mixture as set forth hereinbefore.

The Fann rheology and fluid loss were determined by the procedures set forth in the American Petroleum Institute's Recommended Practice 13B-1.

EXAMPLE 1

Fluids were prepared containing 3.5 ppb of xanthan gum, 5.0 ppb OSM, and from 0–30% by volume diesel oil as indicated for fluids A-1 through A-4 in Table A. Additionally, fluids A-5 through A-7 were prepared by diluting a fluid of composition A-1 with the concentration of diesel oil set forth in Table A. The Brookfield viscosities were obtained initially and after aging the fluids at 180° F. for 16 hours.

The data indicate that the viscosity increases as the concentration of oil increases, and that the addition of the oil enables fluids to be prepared having the desired viscosity at lower concentrations of the expensive biopolymer.

EXAMPLE 2

Fluids were prepared containing 2.0 ppb xanthan gum, 5.0 ppb OSM, and either 0 or 1.0 ppb lime. Fluids of these compositions were also prepared and diluted with the concentrations of an isomerized internal olefin synthetic oil set forth in Table B. The fluids were evaluated as in Example 1.

The data indicate that the viscosity increases as the concentration of oil increases, and that the lime increased the viscosity and thermal stability of the fluids.

EXAMPLE 3

Fluids were prepared containing the concentrations of xanthan gum, OSM, lime, and diesel oil set forth in Table C. The Fann API rheology was obtained initially and after aging at 185° F. for 16 hours. The API low temperature fluid loss of the aged samples was also obtained. The data are set forth in Table C.

The data confirms the previous effects observed for the oil and lime, and indicate that oil-in-water emulsions can be prepared by the combined addition of the OSM and lime without any polymer being present in the fluids.

EXAMPLE 4

Fluids were prepared containing 1.0 ppb xanthan gum, 5.0 ppb OSM, 25% by volume diesel oil, and the concentrations of lime set forth in Table D. Formic acid and acetic acid were added to fluids D-3 and D-4 respectively, which were gelled. The Fann API rheology of the fluids was obtained initially and after aging the fluids at 185° F. for 16 hours. The data obtained is set forth in Table D.

The data indicate that the viscosity of the fluids can be adjusted by the addition of lime to increase the viscosity, and the addition of an acid to decrease the viscosity, as desired.

EXAMPLE 5

Fluids were prepared containing 10 ppb OSM and the concentrations of xanthan gum, lime, and ESCAID 110 mineral oil set forth in Table E in an aqueous brine containing 25% by weight sodium chloride. The Brookfield viscosities, pH and density of the fluids were determined initially and after hot rolling the fluids at 185° F. for 16 hours. The concentration of aphrons (micro-bubbles) was estimated from the density of the fluids using the formula [(1−Density)÷(Theo.Density)](100). The data obtained are set forth in Table E.

EXAMPLE 6

A fluid (F-1) was prepared containing 10 ppb OSM, 1.5 ppb xanthan gum, and 0.75 ppb PASSIVATOR anti-foaming additive in a brine containing 25% by weight sodium chloride. Fluids F-2 through F-5 were prepared by admixing the fluid with various quantities of ESCAID 110 mineral oil as indicated in Table F. Fluids F-6 through F-10 were prepared by admixing the fluid with 2 ppb lime and various quantities of ESCAID 110 mineral oil. The fluids were evaluated for Brookfield viscosity after hot rolling at 185° F. for 16 hours, cooling, and re-mixing. The data obtained are set forth in Table F.

The data confirms the results obtained in Example 1.

TABLE A

| | A-1 | A-2 | A-3 | A-4 | A-5 | A-6 | A-7 |
|---|---|---|---|---|---|---|---|
| Fluid | | | | | | | |
| Xanthan Gum, ppb | 3.5 | 3.5 | 3.5 | 3.5 | 3.15 | 2.8 | 2.45 |
| OSM, ppb | 5.0 | 5.0 | 5.0 | 5.0 | 4.5 | 4.0 | 3.5 |
| Oil, %* | 0 | 10 | 20 | 30 | 10 | 20 | 30 |
| Initial Brookfield Viscosities | | | | | | | |
| 0.5 rpm, cp(×10$^{-3}$) | 84 | 93 | 112 | 136.4 | 83 | 81 | 82 |
| 100 rpm, cp | 810 | 944 | 1157 | 1440 | 880 | 920 | 1012 |
| STI | 104 | 99 | 97 | 95 | 94 | 88 | 81 |
| Brookfield Viscosity After Aging at 185° F. for 16 hours | | | | | | | |
| 0.5 rpm, cp(×10$^{-3}$) | 53 | 70 | 100 | 126 | 52 | 52.5 | 63 |
| 100 rpm, cp | 633 | 830 | 1150 | 1490 | 665 | 723 | 915 |
| STI | 84 | 84 | 87 | 85 | 78 | 73 | 69 |

*% by volume based on the combined volume of oil and water

TABLE B

| | B-1 | B-2 | B-3 | B-4 | B-5 | B-6 | B-7 | B-8 |
|---|---|---|---|---|---|---|---|---|
| Fluid | | | | | | | | |
| Xanthan Gum, ppb | 2.0 | 1.67 | 1.0 | 0.7 | 2.0 | 1.67 | 1.0 | 0.7 |
| OSM, ppb | 5.0 | 5.0 | 5.0 | 5.0 | 5.0 | 5.0 | 5.0 | 5.0 |
| Lime, ppb | 0 | 0 | 0 | 0 | 1.0 | 1.0 | 1.0 | 1.0 |
| Oil, %* | 0 | 16.7 | 50 | 65 | 0 | 16.7 | 50 | 65 |
| Initial Brookfield Viscosities | | | | | | | | |
| 0.5 rpm, cp (×10$^{-3}$) | 24 | 30.8 | 34.2 | 46 | 22.8 | 28.4 | 78 | 540 |
| 100 rpm, cp | 360 | 445 | 745 | 1355 | 428 | 470 | 1820 | 6180 |
| STI | 67 | 69 | 46 | 34 | 53 | 60 | 43 | 87 |
| Brookfield Viscosity After Aging at 185° F. for 16 hours | | | | | | | | |
| 0.5 rpm, cp (×10$^{-3}$) | 11.5 | 13 | 26 | 36.4 | 11.6 | 18 | 57 | 136 |
| 100 rpm, cp | 243 | 330 | 668 | 840 | 263 | 420 | 1360 | 1825 |
| STI | 47 | 39 | 39 | 43 | 44 | 43 | 42 | 75 |

*% by volume based on the combined volume of oil and water

TABLE C

| | C-1 | C-2 | C-3 | C-4 | C-5 |
|---|---|---|---|---|---|
| Fluid | | | | | |
| Xanthan Gum, ppb | 1.0 | 1.0 | 1.0 | 1.0 | 0 |
| OSM, ppb | 10 | 10 | 10 | 10 | 3.35 |
| Lime, ppb | 0 | 0 | 1.5 | 3.0 | 2.0 |
| Oil, % v/v | 0 | 50 | 50 | 50 | 50 |
| INITIAL PROPERTIES | | | | | |
| Fann Rheology | | | | | |
| 600 rpm | 18 | 217 | OS | OS | 130 |
| 300 rpm | 13.5 | 144 | 261 | OS | 85 |
| 200 rpm | 11.5 | 115 | 205 | OS | 64 |
| 100 rpm | 9 | 78 | 136 | 276 | 39 |
| 6 rpm | 4.5 | 25 | 41 | 70 | 6 |
| 3 rpm | 4 | 21 | 35 | 43 | 4.5 |
| PV, cp | 4.5 | 73 | — | — | 45 |
| YP, lb/100 sq. ft. | 9 | 71 | — | — | 40 |
| After Static Aging @ 185° F. for 16 Hours and Spatulation | | | | | |
| Fann Rheology | | | | | |
| 600 rpm | 17 | 157 | 295 | 260 | 118 |
| 300 rpm | 13 | 113 | 210 | 185 | 80 |
| 200 rpm | 11 | 93 | 170 | 149 | 55 |
| 100 rpm | 9 | 68 | 120 | 105 | 30 |
| 6 rpm | 4 | 22 | 37 | 31 | 2.5 |
| 3 rpm | 3.5 | 17.5 | 30 | 26 | 2 |
| PV, cp | 4 | 44 | 85 | 75 | 38 |
| YP, lb/100 sq. ft. | 9 | 69 | 125 | 110 | 42 |
| API Fluid Loss, cc | 14.5 | 2 | 1 | 1 | — |

TABLE D

|  | D-1 | D-2 | D-3 | D-4 | D-3A | D-4A |
|---|---|---|---|---|---|---|
| 1.0 ppb Xanthan Gum, 5.0 ppb OSM, 25% v/v Diesel Oil | | | | | | |
| Fluid | | | | | | |
| Lime, ppb | 0 | 0.5 | 1.0 | 2.0 | 1.0 | 2.0 |
| 90% Formic Acid, ppb | 0 | 0 | 0 | 0 | 2.1 | 0 |
| Glacial Acetic Acid, ppb | 0 | 0 | 0 | 0 | 0 | 1.5 |
| Initial Fann Rheology | | | | | | |
| 600 rpm | 44 | 58 | G | G | 48.5 | 57 |
| 300 rpm | 31 | 40.5 | E | E | 34.5 | 41 |
| 200 rpm | 26 | 33 | L | L | 29 | 34 |
| 100 rpm | 20 | 24.5 | L | L | 22.5 | 25 |
| 6 rpm | 9.5 | 11 | E | E | 9.5 | 10 |
| 3 rpm | 8 | 9.5 | D | D | 7.5 | 8 |
| PV, cp | 13 | 17.5 | — | — | 14 | 16 |
| YP, lb/100 sq. ft. | 18 | 23 | — | — | 20.5 | 25 |
| After Static Aging @ 185° F. for 16 Hours and Spatulation | | | | | | |
| Fann Rheology | | | | | | |
| 600 rpm | 39 | 45 | — | — | 33.5 | 46.5 |
| 300 rpm | 28 | 33 | — | — | 24.5 | 34.5 |
| 200 rpm | 23.5 | 28 | — | — | 21 | 29 |
| 100 rpm | 18 | 22 | — | — | 16.5 | 21.5 |
| 6 rpm | 7 | 10 | — | — | 6.5 | 6.5 |
| 3 rpm | 5.5 | 8.5 | — | — | 5 | 5 |
| PV, cp | 11 | 12 | — | — | 9 | 12 |
| YP, lb/100 sq. ft. | 17 | 21 | — | — | 15.5 | 22.5 |

TABLE E

|  | E-1 | E-2 | E-3 | E-4 | E-5 | E-6 |
|---|---|---|---|---|---|---|
| 10 ppb OSM, 25% NaCl AQUEOUS PHASE | | | | | | |
| Fluid | | | | | | |
| Oil, % v/v | 0 | 5 | 10 | 0 | 5 | 10 |
| Xanthan Gum, ppb | 2.0 | 1.9 | 1.8 | 2.0 | 1.9 | 1.8 |
| Lime, ppb | 0 | 0 | 0 | 2 | 2 | 2 |
| Initial Brookfield Viscosities | | | | | | |
| 0.3 rpm, cp($\times 10^{-3}$) | 36.3 | 47.0 | 49.3 | 28.0 | 29.0 | 27.3 |
| 0.5 rpm, cp($\times 10^{-3}$) | 25.8 | 33.0 | 34.6 | 22.0 | 22.8 | 22.4 |
| STI | 65 | 67 | 64 | 41 | 49 | 43 |
| pH | 3.0 | 3.1 | 2.4 | 9.8 | 9.4 | 9.3 |
| Density, ppg | 7.7 | 7.9 | 8.0 | 7.5 | 8.1 | 8.5 |
| Aphrons, % v/v | 23 | 20 | 17.5 | 25 | 17.8 | 12.4 |
| After Hot Rolling at 185° F. for 16 Hours and Mixing | | | | | | |
| Brookfield Viscosities | | | | | | |
| 0.3 rpm, cp($\times 10^{-3}$) | 16.3 | 15.3 | 11.7 | 25.0 | 27.3 | 38.3 |
| 0.5 rpm, cp($\times 10^{-3}$) | 13.4 | 13.4 | 11.0 | 21.4 | 22.0 | 28.2 |
| STI | 33 | 30 | 23 | 45 | 47 | 56 |
| pH | 3.7 | 3.6 | 3.7 | 7.6 | 7.3 | 7.6 |
| Density, ppg | 8.5 | 8.3 | 7.7 | 8.3 | 9.0 | 8.75 |
| Aphrons, % v/v | 15 | 15.7 | 20.6 | 17 | 8.6 | 9.8 |

TABLE F

| | | | 10 ppb OSM, 25% NaCl AQUEOUS PHASE | | |
|---|---|---|---|---|---|
| | Xanthan | | | Brookfield Viscosities* | |
| Fluid | % Oil | Gum ppb | Lime ppb | PASSIVATOR ppb | 0.5 rpm | STI |
| F-1 | 0 | 1.5 | 0 | 0.75 | 1900 | 12 |
| F-2 | 5 | 1.42 | 0 | 0.71 | 2800 | 15 |
| F-3 | 10 | 1.35 | 0 | 0.68 | 2500 | 12 |
| F-4 | 15 | 1.28 | 0 | 0.64 | 3400 | 12 |
| F-5 | 20 | 1.2 | 0 | 0.6 | 4300 | 14 |
| F-6 | 0 | 1.5 | 2 | 0.75 | 2300 | 13 |
| F-7 | 5 | 1.42 | 2 | 0.71 | 5200 | 24 |
| F-8 | 10 | 1.35 | 2 | 0.68 | 10200 | 39 |
| F-9 | 15 | 1.28 | 2 | 0.64 | 11500 | 34 |
| F-10 | 20 | 1.2 | 2 | 0.6 | 14200 | 36 |

*After Hot Rolling at 185° F. for 16 Hours and Mixing

What is claimed is:

1. A method of increasing the low shear rate viscosity of an aqueous polysaccharide-containing fluid which comprises incorporating into the fluid (1) an oligosaccharide mixture composed of sugar units selected from the group consisting of arabinose, mannose, galactose, glucose, xylose, and mixtures thereof, and which consists primarily of pentosans and hexosans containing from one to about ten combined sugar units, and (2) an oleaginous liquid.

2. The method of claim 1 wherein the oligosaccharide mixture comprises the water soluble portion of thermally hydrolyzed lignocellulose.

3. The method of claim 1 or 2 wherein the fluid has incorporated therein an alkaline earth metal oxide or hydroxide.

4. The method of claim 1 or 2 wherein the fluid has lime incorporated therein.

5. The method of claim 1 or 2 wherein the polysaccharide is a biopolymer.

6. An oil-in-water emulsion comprising (1) an aqueous continuous phase, (2) a polysaccharide hydrated in the aqueous phase, (3) an oligosaccharide mixture composed of sugar units selected from the group consisting of arabinose, mannose, galactose, glucose, xylose, and mixtures thereof, and which consists primarily of pentosans and hexosans containing from one to about ten combined sugar units, and (4) an oleaginous liquid emulsified into the aqueous phase.

7. The oil-in-water emulsion of claim 6 which additionally contains an alkaline earth metal oxide or hydroxide.

8. The oil-in-water emulsion of claim 6 which additionally contains lime.

9. The oil-in-water emulsion of claim 6 which additionally contains a foaming surfactant and aphrons generated therein.

10. The oil-in-water emulsion of claim 9 which additionally contains an alkaline earth metal oxide or hydroxide.

11. The oil-in-water emulsion of claim 9 which additionally contains lime.

12. The oil-in-water emulsion of claim 6, 7, 8, 9, 10, or 11 wherein the oligosaccharide mixture comprises the water soluble portion of thermally hydrolyzed lignocellulose.

13. The oil-in-water emulsion of claim 6, 7, 8, 9, 10, or 11 wherein the polysaccharide is a biopolymer.

* * * * *